United States Patent
Yamana et al.

(10) Patent No.: US 10,352,545 B2
(45) Date of Patent: Jul. 16, 2019

(54) WAVELENGTH CONVERSION DEVICE AND LIGHTING APPARATUS

(71) Applicant: Panasonic Intellectual Property Management Co., Ltd., Osaka (JP)

(72) Inventors: Masahito Yamana, Hyogo (JP); Noboru Iizawa, Osaka (JP); Yoshiyuki Nakano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/765,260

(22) PCT Filed: Oct. 6, 2016

(86) PCT No.: PCT/JP2016/004501
§ 371 (c)(1),
(2) Date: Mar. 31, 2018

(87) PCT Pub. No.: WO2017/149566
PCT Pub. Date: Sep. 8, 2017

(65) Prior Publication Data
US 2018/0292077 A1    Oct. 11, 2018

(30) Foreign Application Priority Data

Mar. 4, 2016    (JP) .................................. 2016-042724

(51) Int. Cl.
*F21V 21/00*    (2006.01)
*F21V 29/502*   (2015.01)
(Continued)

(52) U.S. Cl.
CPC ............ *F21V 29/502* (2015.01); *F21V 5/004* (2013.01); *F21V 9/30* (2018.02); *G02B 5/1876* (2013.01);
(Continued)

(58) Field of Classification Search
CPC ............ F21V 9/30; F21V 5/004; F21V 13/02; G02B 5/1875; F21W 2131/20
(Continued)

(56) References Cited

U.S. PATENT DOCUMENTS 5,237,451 A    8/1993 Saxe
2013/0271954 A1*  10/2013 Li .............................. F21V 9/40
                                                                        362/84

(Continued)

FOREIGN PATENT DOCUMENTS

JP    2-222918    9/1990
JP    3-210521    9/1991
(Continued)

OTHER PUBLICATIONS

Extended European Search Report for corresponding European Application No. 16892411.6 dated Nov. 7, 2018.
(Continued)

*Primary Examiner* — Laura K Tso
(74) *Attorney, Agent, or Firm* — Renner, Otto, Boisselle & Sklar, LLP (57) ABSTRACT

A wavelength conversion device includes: a light source that emits light having a predetermined wavelength included in a wavelength range from ultraviolet light to visible light; a phosphor layer that converts the wavelength of light from the light source which is incident on an incidence face thereof; and an optical component that is disposed between the light source and the phosphor layer, and projects light emitted by the light source onto the incidence face of the phosphor layer in a ring shape.

11 Claims, 12 Drawing Sheets

(51) Int. Cl.
*F21V 9/30* (2018.01)
*G02B 7/00* (2006.01)
*G03B 21/16* (2006.01)
*F21V 5/00* (2018.01)
*G02B 5/18* (2006.01)
*F21Y 115/10* (2016.01)
*F21V 13/02* (2006.01)
*F21W 131/20* (2006.01)
*F21Y 115/30* (2016.01)

(52) U.S. Cl.
CPC ............ *G02B 7/008* (2013.01); *G03B 21/16* (2013.01); *F21V 13/02* (2013.01); *F21W 2131/20* (2013.01); *F21Y 2115/10* (2016.08); *F21Y 2115/30* (2016.08)

(58) Field of Classification Search
USPC .............................................. 362/311.02, 84
See application file for complete search history.

(56) References Cited

U.S. PATENT DOCUMENTS

2014/0185272 A1* 7/2014 Kishimoto ............. F21V 14/08
362/84
2014/0369064 A1* 12/2014 Sakaue ............. G02B 27/0994
362/553

FOREIGN PATENT DOCUMENTS

| | | |
|---|---|---|
| JP | 5-303052 | 11/1993 |
| JP | 2005-257735 | 9/2005 |
| JP | 2006-229075 | 8/2006 |
| JP | 2012-104267 | 5/2012 |
| JP | 2012123371 A | 6/2012 |
| TW | 201546395 A | 12/2015 |
| WO | 2013/114747 A1 | 8/2013 |

OTHER PUBLICATIONS

International Search Report (ISR) and Written Opinion (WO) dated Dec. 20, 2016 in International (PCT) Application No. PCT/JP2016/004501.
Office Action dated Sep. 12, 2018 and Search Report for corresponding Taiwanese Patent Application No. 105132295. (Copy previously submitted on Oct. 11, 2018).

* cited by examiner

WAVELENGTH CONVERSION DEVICE AND LIGHTING APPARATUS

TECHNICAL FIELD

The present invention relates to a wavelength conversion device and a lighting apparatus.

BACKGROUND ART

There are lights which use a solid-state light source such as a laser. In such lights, white light is created by irradiating phosphor with blue light emitted by the solid-state light source. The phosphor causes yellow light resulting from excitation by one part of the blue light and the other part of the blue light that is transmitted to disperse, thereby enabling the production of white light obtained through the mixing of these lights.

On the other hand, solid-state lighting sources such as a laser have strong directionality and high energy density. As such, when phosphor is directly irradiated with the blue light emitted by a solid-state light source, the region of the phosphor which is irradiated generates much heat and becomes hot. Since phosphor has a thermal quenching property in which wavelength conversion efficiency deteriorates with increasing temperature, it is necessary to suppress the rise in temperature of the phosphor.

In view of this, for example, Patent Literature 1 discloses a lighting apparatus in which a diffusion means which diffuses light from a solid-state light source is formed on a phosphor layer. According to Patent Literature 1, the diffusion means diffuses the energy distribution of the light from the solid-state light source, to thereby prevent concentration of energy (reduce the thermal load) on the phosphor layer and suppress rising of the temperature of the phosphor layer.

CITATION LIST

Patent Literature

PTL 1: Japanese Unexamined Patent Application Publication No. 2012-104267

SUMMARY OF THE INVENTION

Technical Problems

With the above-described background art, however, although the thermal load on the phosphor layer can be reduced, there is the problem that dispersion of part of the light from the solid-state light source leads to dispersion loss. Specifically, with the above-described background art, there is the problem that it is difficult to achieve high output by the lighting apparatus.

The present invention is conceived in view of the above-described problems and has as an object to provide a waveform conversion device capable of achieving high output while reducing the thermal load on the phosphor layer, and a lighting apparatus using the same.

Solution to Problems

In order to achieve the aforementioned object, a wavelength conversion device according to an aspect of the present invention includes: a light source that emits light having a wavelength that is predetermined, the wavelength being included in a wavelength range from ultraviolet light to visible light; a phosphor layer that converts the wavelength of light from the light source which is incident on an incidence face of the phosphor layer; and an optical component that is disposed between the light source and the phosphor layer, and projects light emitted by the light source onto the incidence face of the phosphor layer in a ring shape.

Advantageous Effect of Invention

The wavelength conversion device according to an aspect of the present invention is capable of achieving high output while reducing thermal load on the phosphor layer.

DESCRIPTION OF EXEMPLARY EMBODIMENTS

Hereinafter, embodiments will be described with reference to the drawings. Each of the embodiments described herein show a specific example of the present invention. Therefore, numerical values, shapes, materials, structural components, the arrangement and connection of the structural components, steps (processes), the sequence of the steps, etc. shown in the following embodiments are mere examples, and are not intended to limit the scope of the present invention. Among the structural components in the following embodiments, components not recited in the independent claims are described as structural components that can be arbitrarily added. Furthermore, the respective figures are schematic diagrams and are not necessarily precise illustrations.

Embodiment

[Lighting Apparatus]

Hereinafter, a lighting apparatus will be described as an example of an application product using a wavelength conversion apparatus in this embodiment.

Figure 1:
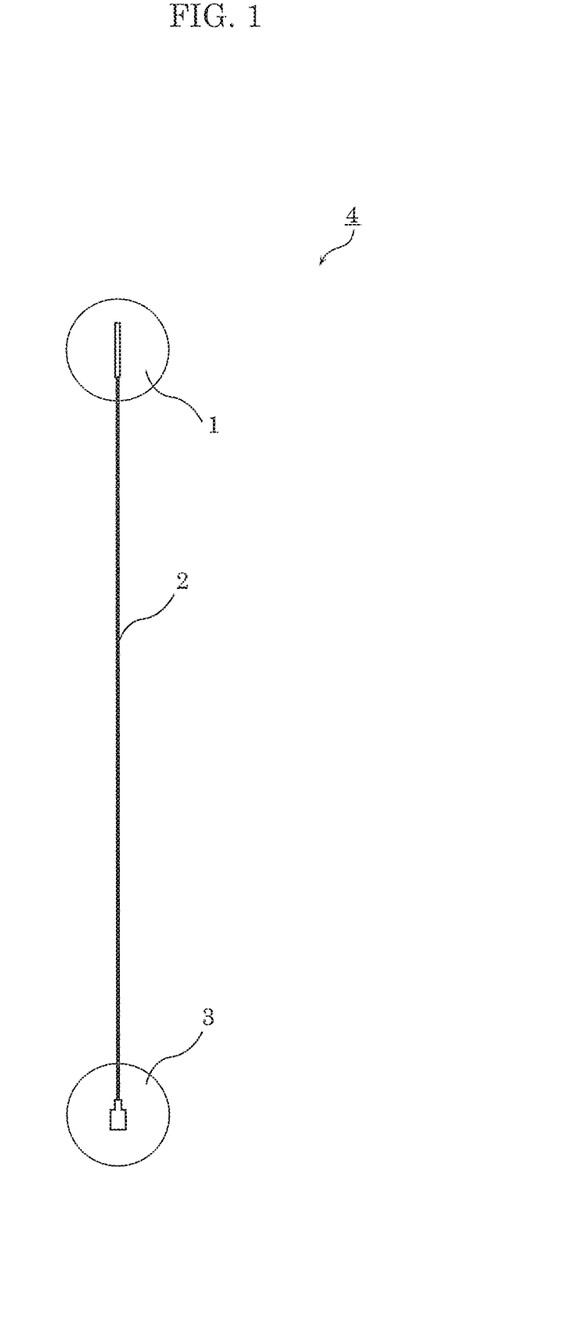
FIG. 1 is a diagram illustrating an example of a lighting apparatus in which a wavelength conversion device in an embodiment is used.

FIG. 1 is a diagram illustrating an example of lighting apparatus 4 in which wavelength conversion device 1 in this embodiment is used.

Lighting apparatus 4 illustrated in FIG. 1 is for example an endoscope or a fiberscope, and includes wavelength conversion device 1, optical fiber 2, and lighting component 3.

Optical fiber cable 2 is a transmission path for transmitting light over a distance. Optical fiber 2 has a two-part structure consisting of a core that has a high refractive index and a cladding layer that surrounds the core and has a lower refractive index than the core. Both the core and the cladding layer are made of quartz glass or plastic having extremely high light transmissivity.

Lighting component 3 is used for irradiating an observation target with light transmitted from wavelength conversion device 1 via optical fiber 2. Lighting component 3 includes, for example, a stainless steel fiber coupling, a stainless steel ferrule, one or more glass lenses, an aluminum holder, and an aluminum outer hull.

In lighting apparatus 4, wavelength conversion device 1 corresponds to a light source means that uses a laser, and causes light to enter optical fiber 2. Hereinafter, details of wavelength conversion device 1 will be described.

[Wavelength Conversion Device]

Figure 2:
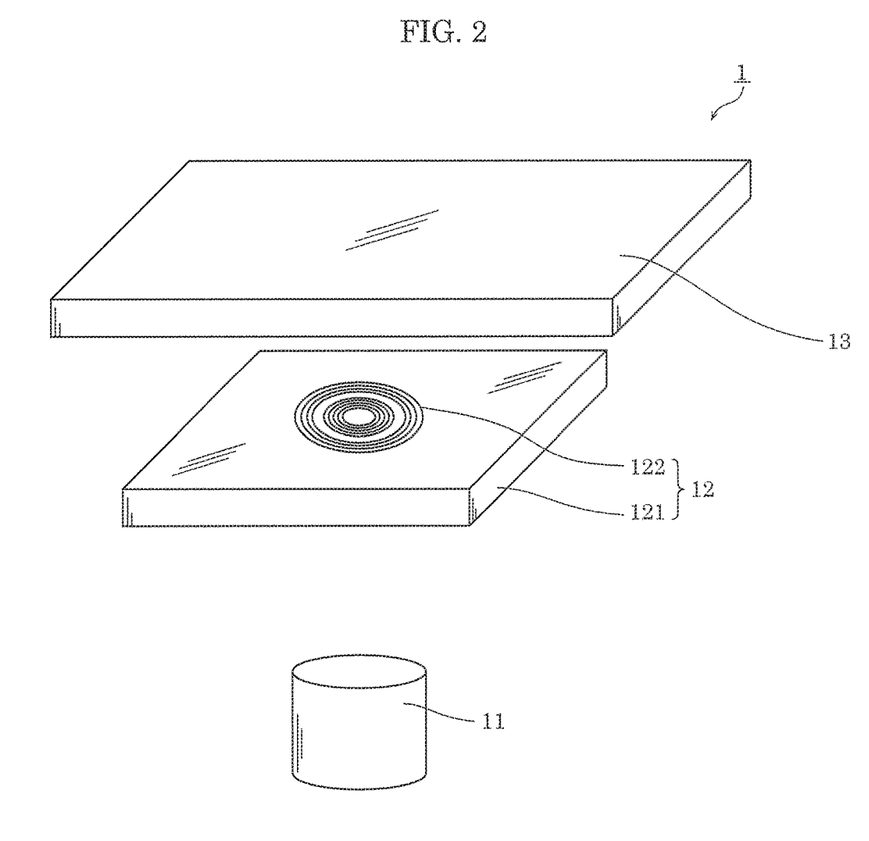
FIG. 2 is a diagram illustrating an example of a configuration of the wavelength conversion device in the embodiment.

FIG. 2 is a diagram illustrating an example of a configuration of wavelength conversion device 1 in this embodiment.

As illustrated in FIG. 2, wavelength conversion device 1 includes light source 11, optical component 12, and phosphor layer 13.

(Light Source 11)

Light source 11 emits light of a predetermined wavelength a wavelength range from ultraviolet light to visible light. In this embodiment, light source 11 is a laser that emits blue light.

(Optical Component 12)

Figure 3A:
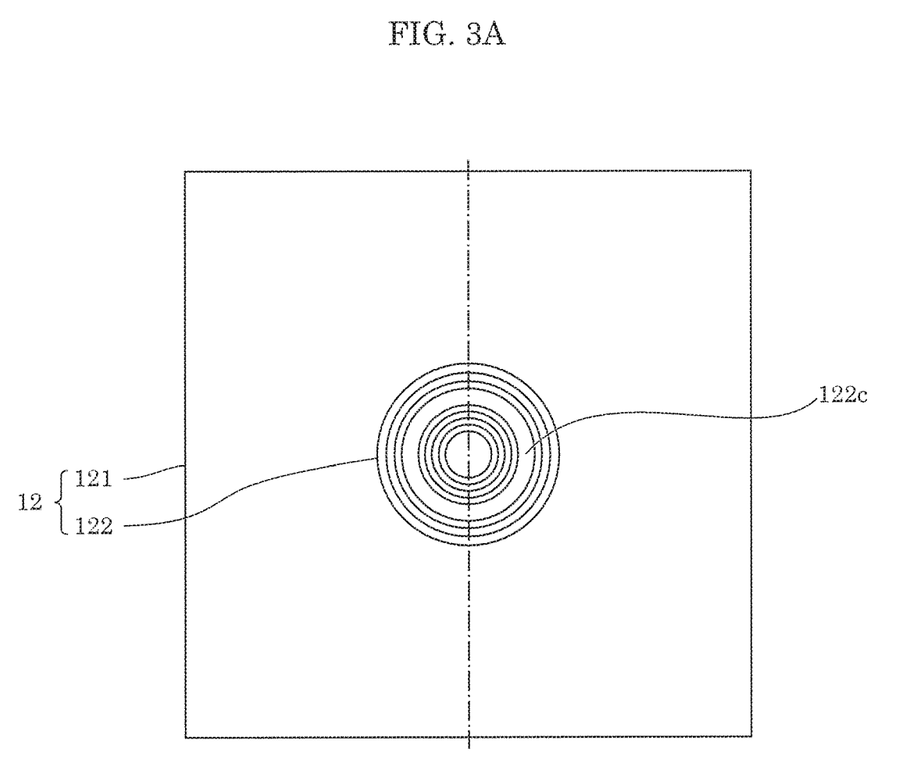
FIG. 3A is a diagram illustrating a top view of a configuration of an optical component in the embodiment.
Figure 3B:
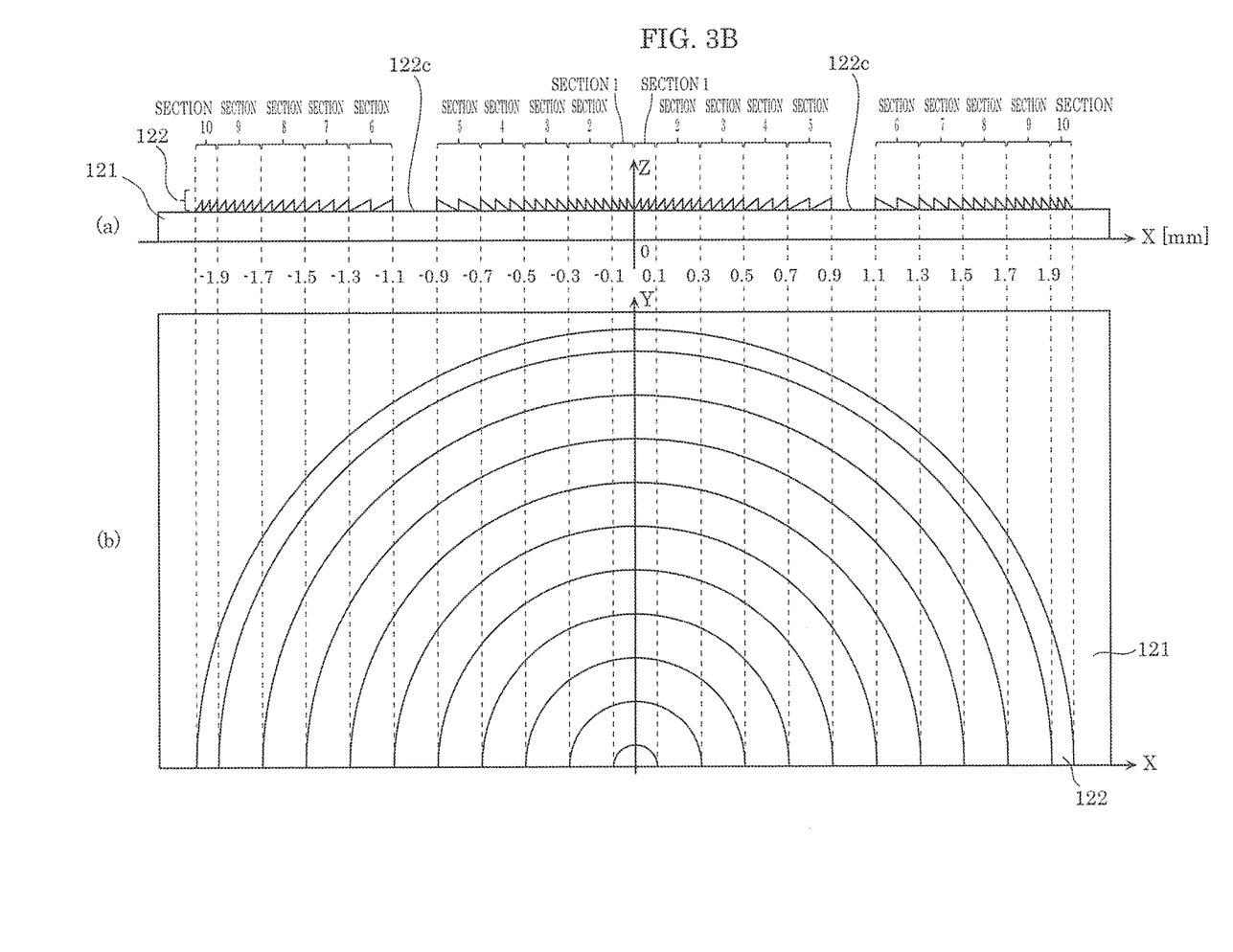
FIG. 3B is a diagram illustrating a top view and a cross-sectional view of a diffractive lens array illustrated in FIG. 3A.

FIG. 3A is a diagram illustrating a top view of a configuration of optical component 12 in this embodiment. FIG. 3B is a diagram illustrating a top view and a cross-sectional view of diffractive lens array 122 illustrated in FIG. 3A.

Optical component 12 is disposed between light source 11 and phosphor layer 13, and projects light emitted by light source 11 onto the incidence face of phosphor layer 13 in a ring shape. Optical component 12 projects the light emitted by light source 11 in a ring shape, which is centered on the optical axis of light source 11 and has a diameter less than or equal to the diameter of the light emitted by light source 11, onto the incidence face of phosphor layer 13. Optical component 12 is an example of a diffractive microlens array, and, as illustrated in FIG. 2 and FIG. 3A includes, for example, base material 121 and diffractive lens array 122.

Base material 121 is a base material of the diffractive microlens array. Specifically, diffractive lens array 122 is formed on base material 121.

It should be noted that an arbitrary material such as glass or plastic, for example, can be used for the material forming base material 121. Here, as glass, it is possible to use, for example, soda glass, non-alkali glass, etc. Furthermore, as plastic, it is possible to use, for example, acrylic resin, polycarbonate, polyethylene terephthalate (PET), polyethylene naphthalate (PEN), etc. Furthermore, the material of base material 121 needs to be selected with consideration to thermal resistance. In addition, base material 121 may be transparent with no light absorption, and may be formed from a material having a substantially 0 extinction coefficient.

Diffractive lens array 122 projects the light emitted by light source 11 onto the incidence face of phosphor layer 13 in a ring shape. Diffractive lens array 122 is provided on the emission face (i.e., in the diffractive microlens array) of optical component 12, and, as illustrated in FIG. 3A and in (a) in FIG. 3B, for example, includes diffractive lenses that diffract the light emitted by light source 11, and rectilinear transmission portion 122c that rectilinearly transmits the light emitted by light source 11.

In this embodiment, the case where diffractive lens array 122 includes a single rectilinear transmission portion 122c will be described. It should be noted that the center of diffractive lens array 122 is indicated by the intersection of the X-axis and the Y-axis in the example illustrated in (b) in FIG. 3B, and is indicated by the Z-axis in the example illustrated in (a) in FIG. 3B. Furthermore, although, in the example illustrated in (a) in FIG. 3B, the direction from the center of diffractive lens array 122 toward the periphery is indicated by the direction along the X-axis heading away from the Z-axis, the same is true for the direction along the Y-axis heading away from the Z-axis, and thus illustration is omitted. Furthermore, in FIG. 3A and FIG. 3B, assuming the spot diameter of the light of light source 11 to be 3 mm, the thickness of base material 121 is for example 1 mm, and the diameter of diffractive lens array 122 is for example 4 mm.

As illustrated in FIG. 3A, rectilinear transmission portion 122c corresponds to the annular region in which diffractive lenses are not provided when seen from a top view of optical component 12, and is provided to be a flat face that is substantially parallel to the emission face of optical component 12. More specifically, as illustrated in (a) in FIG. 3B, rectilinear transmission portion 122c is provided in the region of the surface of diffractive lens array 122 in which diffractive lenses are not provided, so as to be a flat face that is substantially parallel to the top face of base material 121 (i.e., the emission face of optical component 12). Rectilinear transmission portion 122c rectilinearly transmits the light emitted by light source 11 entering from one side in the Z-axis, as is (i.e., without causing diffraction, etc.). It should be noted that, in the example illustrated in (a) in FIG. 3B, because the spot diameter of the light of light source 11 is 3 mm, rectilinear transmission portion 122c is provided in a region between a circle having a radius of 0.9 mm and a circle having a radius of 1.1 mm, with the center of diffractive lens array 122 (i.e., the Z-axis) as an origin.

As illustrated in FIG. 3A, the diffractive lenses are provided in concentric circle shapes on the emission face of optical component 12 when seen from a top view of optical component 12. As illustrated in (a) in FIG. 3B, the cross-section of the diffractive lenses taken along a plane perpendicular to the emission face is sawtooth-shaped. Here, the pitch of the diffractive lenses is different for each of predetermined sections.

More specifically, as illustrated in (a) in FIG. 3B, the diffractive lenses are provided, in a region of the surface of diffractive lens array 122 in which rectilinear transmission portion 122c is not provided, in concentric circle shapes with a different pitch for each of predetermined sections. Because the cross-section of the diffractive lenses taken along a plane perpendicular to the emission face is sawtooth-shaped, diffractive lens array 122 corresponds to what is called a blazed diffraction grating. With this, diffractive lens array 122 is capable of increasing primary diffraction efficiency and reducing loss (optical loss) of light from light source 11.

Furthermore, the pitch of the diffractive lenses increases from the center of optical component 12 to rectilinear transmission portion 122c, and decreases from rectilinear transmission portion 122c outward, in a top view. More specifically, as illustrated in (a) in FIG. 3B, the pitch of the diffractive lenses is the same in the same section but is different between sections 1 to 5 and sections 6 to 10. In addition, the pitch of the diffractive lenses increases with proximity to rectilinear transmission portion 122c, so as to be greater in section 2 than in section 1 and greater in section 3 than in section 2, etc. In the example in FIG. 3B, section 1 is a region between a circle having a radius of 0 mm and a circle having a radius of 0.1 mm, with the Z-axis as an origin; section 2 is a region between the circle having a radius of 0.1 mm and a circle having a radius of 0.3 mm, with the Z-axis as an origin. Section 3 is a region between the circle having a radius of 0.3 mm and a circle having a radius of 0.5 mm, with the Z-axis as an origin; and section 4 is a region between the circle having a radius of 0.5 mm and a circle having a radius of 0.7 mm, with the Z-axis as an origin. Section 5 is a region between the circle having a radius of 0.7 mm and a circle having a radius of 0.9 mm, with the Z-axis as an origin; and section 6 is a region between a circle having a radius of 1.1 mm and a circle having a radius of 1.3 mm, with the Z-axis as an origin. Section 7 is a region between the circle having a radius of 1.3 mm and a circle having a radius of 1.5 mm, with the Z-axis as an origin; and section 8 is a region between the circle having a radius of 1.5 mm and a circle having a radius of 1.7 mm, with the Z-axis as an origin. Section 9 is a region between the circle having a radius of 1.7 mm and a circle having a radius of 1.9 mm, with the Z-axis as an origin; and section 10 is a region between the circle having a radius of 1.9 mm and a circle having a radius of 2 mm, with the Z-axis as an origin. In other words, each of sections 2 to 9 is provided as a 0.2 mm-wide annular region.

Furthermore, in the example in FIG. 3B, the height of the diffractive lenses is 0.9 μm. In addition, the pitch in section 1 and section 10 is 2.3 μm, and the pitch in section 2 and section 9 is 2.9 μm. The pitch in section 3 and section 8 is 3.8 μm, and the pitch in section 4 and section 7 is 5.6 μm. Furthermore, the pitch in section 5 and section 6 is 11.3 μm. In this manner, the pitch of the diffractive lenses increases from the center of optical component 12 to rectilinear transmission portion 122cc, and decreases from rectilinear transmission portion 122c outward, in a top view.

The diffractive lenses provided in the above-described manner are capable of diffracting the light emitted by light source 11 which has entered from one side in the Z-axis toward the light rectilinearly transmitted by rectilinear transmission portion 122c.

Since diffractive lens array 122 configured in the above-described manner is capable of projecting the light emitted by light source 11 onto the incidence face of phosphor layer 13 in a ring shape, energy concentration on the incidence face of phosphor layer 13 can be prevented.

It should be noted that the material of diffractive lens array 122 is selected according to the forming method, thermal resistance, and refractive index of diffractive lens array 122. Methods of forming diffractive lens array 122 include nanoimprinting, printing, photolithography, EB lithography, particle orientation, etc. For the material of diffractive lens array 122, it is sufficient to select an epoxy resin, an acrylic resin, etc., as a UV curing resin, or polym-ethyl methacrylate (PMMA), etc., as a thermoplastic resin, when diffractive lens array 122 is to be formed by nanoimprinting or printing, for example. Furthermore, taking thermal resistance into consideration, glass or quartz may be selected for the material of diffractive lens array 122, and diffractive lens array 122 may be formed by photolithography or EB lithography. Furthermore, diffractive lens array 122 may be formed using a material having a similar refractive index as base material 121 to facilitate entry of light from base material 121. In addition, like base material 121, diffractive lens array 122 may be transparent with no light absorption, and may be formed from a material having a substantially 0 extinction coefficient.

(Phosphor Layer 13)

Phosphor layer 13 produces white light from blue light emitted by light source 11, and causes the white light that is produced to enter optical fiber 2.

More specifically, phosphor layer 13 has a function of wavelength-converting part of the light that has entered the bottom face (incidence face) illustrated in FIG. 2. In this embodiment, blue light from light source 11 enters phosphor layer 13, and phosphor layer 13 emits yellow light resulting from excitation by part of the blue light that has entered. Furthermore, phosphor layer 13 emits (transmits) the other part of the blue light that has entered. In phosphor layer 13, the blue light and the yellow light are emitted in a mixed manner such that phosphor layer 13 emits white light.

As illustrated in FIG. 2, phosphor layer 13 is formed in a tabular shape, for example. Phosphor layer 13 contains phosphor and is formed with a resin such as silicon or epoxy enveloping the phosphor. It should be noted that light lost during wavelength conversion is transformed to heat. Since phosphor layer 13 has a thermal quenching property in which wavelength conversion efficiency deteriorates with increasing temperature, heat dissipation of phosphor layer 13 is very important. Although not particularly illustrated in the figures, phosphor layer 13 may be supported by a heat-dissipating plate formed using a material having high thermal conductivity such as Al. Furthermore, heat dissipation may be enhanced by mixing with the resin forming phosphor layer 13 a material having high thermal conductivity, for example, an inorganic oxide such as ZnO, Furthermore, minute structures may be provided in the incidence face of phosphor layer 13 to facilitate entrance of light to phosphor layer 13 or to facilitate heat dissipation from the incidence face.

[Operation of Wavelength Conversion Device 1]

Next, the operation of wavelength conversion device 1 configured in the above-described manner will be described.

Figure 4:
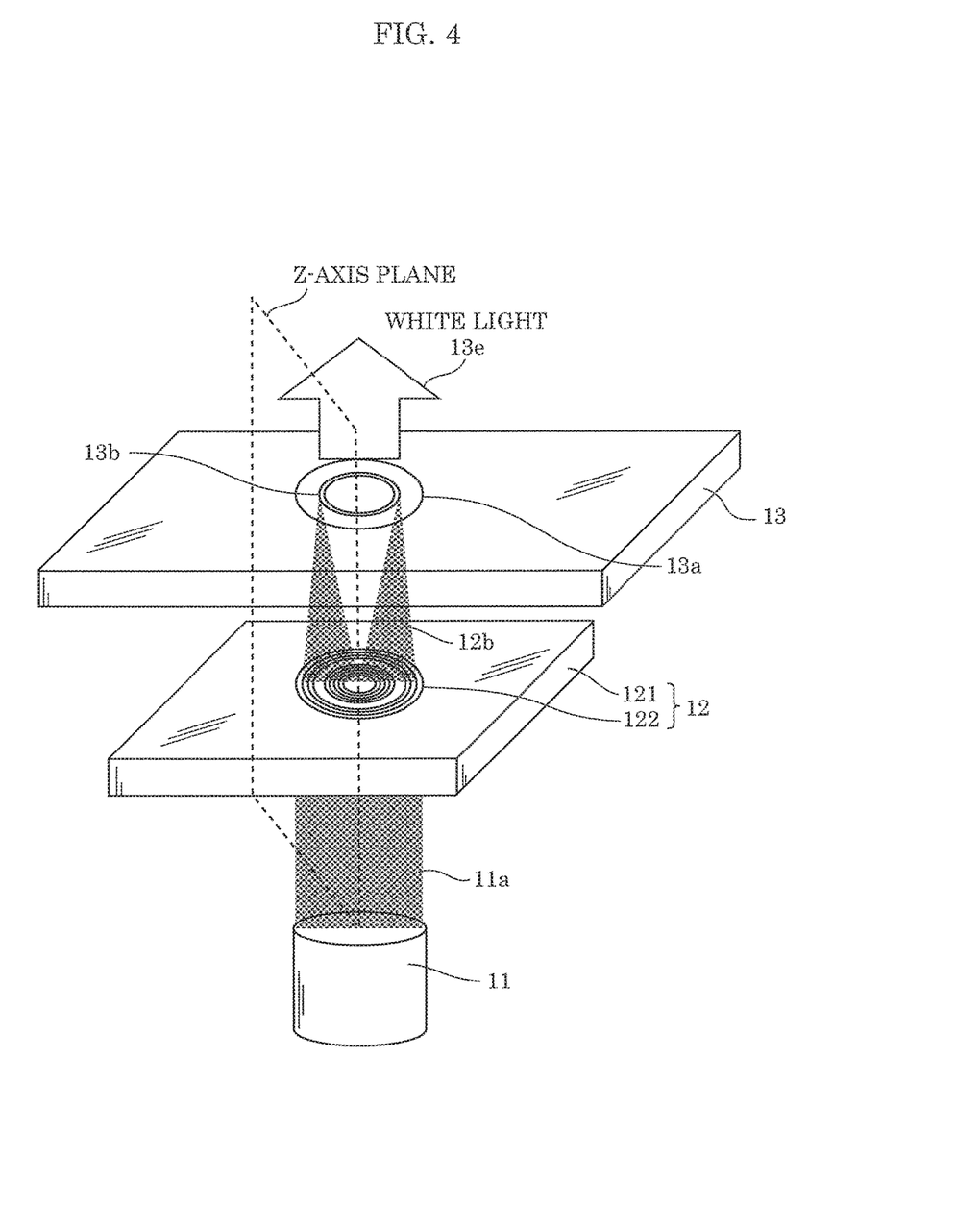
FIG. 4 is a diagram for describing the operation of the wavelength conversion device in the embodiment.
Figure 5:
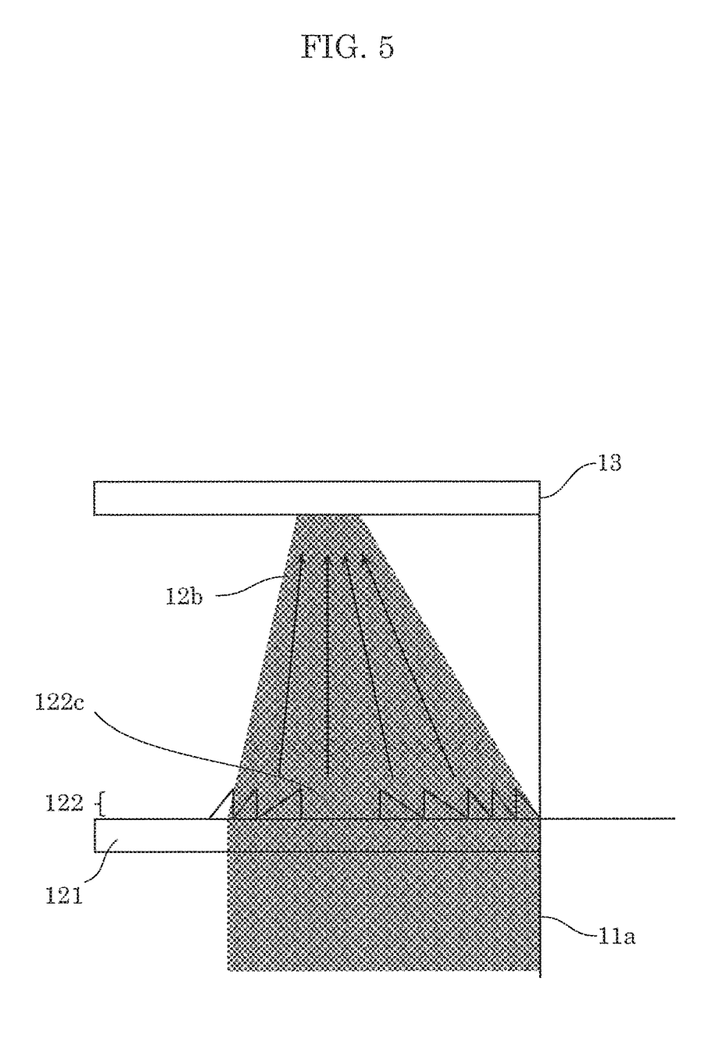
FIG. 5 is a diagram schematically illustrating the projection of light by the optical component illustrated in FIG. 4.
Figure 6:
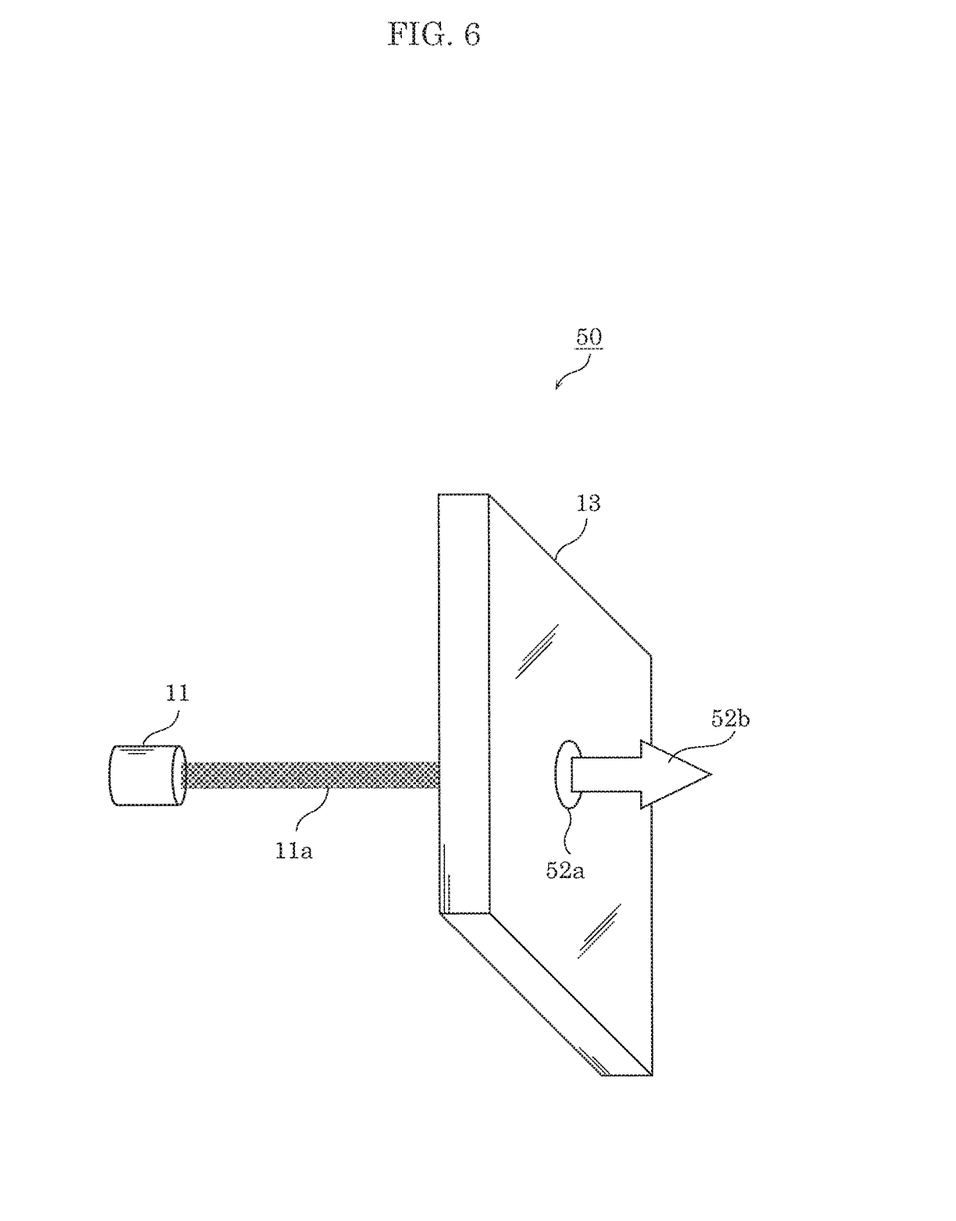
FIG. 6 is a diagram for describing the operation of a comparative example.

FIG. 4 is a diagram for describing the operation of wavelength conversion device 1 in this embodiment. FIG. 5 is a diagram schematically illustrating the projection of light by optical component 12 illustrated in FIG. 4. FIG. 6 is a diagram for describing the operation of a comparative example.

As illustrated in FIG. 4, wavelength conversion device 1 in this embodiment includes optical component 12 disposed between light source 11 and phosphor layer 13, and thus is capable of projecting light 11a emitted by light source 11 onto the incidence face of phosphor layer 13 in a ring shape (i.e., to become ring 13b in the figure). Then, phosphor layer 13 can produce white light 13e.

FIG. 5 illustrates a schematic diagram of the cross-section of wavelength conversion device 1 in this embodiment taken along the Z-axis plane illustrated in FIG. 4. Specifically, as illustrated in FIG. 5, in wavelength conversion device 1 in this embodiment, light 11a emitted by light source 11 is rectilinearly transmitted, as is, in rectilinear transmission portion 122c, but is diffracted by the diffractive lenses toward the light rectilinearly transmitted by rectilinear transmission portion 122c, as schematically represented by light 12b. In this manner, wavelength conversion device 1 in this embodiment projects light 11a from light source 11 onto phosphor layer 13 in a ring shape, using optical component 12.

In this manner, in wavelength conversion device 1 in this embodiment, it is possible to prevent energy concentration on the incidence face of phosphor layer 13.

On the other hand, the comparative example illustrated in FIG. 6 shows wavelength conversion device 50 which does not include optical component 12 in this embodiment.

In wavelength conversion device 50 according to the comparative example illustrated in FIG. 6, light 11a emitted by light source 11 is not projected in a ring shape, and is emitted as is toward region 52a of the incidence face of phosphor layer 13, and white light 52b is produced in region 52a. However, since the energy of light 11a is concentrated on region 52a of phosphor layer 13, a rise in the temperature of region 52a cannot be suppressed. Specifically, the more wavelength conversion device 50 according to the comparative example is used, the more the temperature of region 52a rises, and the wavelength conversion efficiency deteriorates. As such, in wavelength conversion device 50 according to the comparative example, it becomes necessary to reduce the output of light source 11 in order to reduce the energy of light 11a.

As described above, unlike in the comparative example in which light 11a directly enters the incidence face of phosphor layer 13, in wavelength conversion device 1 in this embodiment, it is possible to prevent concentration of energy on the incidence face. Accordingly, since the rise in temperature of phosphor layer 13 can be suppressed, the full amount of light emitted by light source 11 can be emitted toward phosphor layer 13 without loss. Specifically, according to wavelength conversion device 1 in this embodiment, the rise in temperature of phosphor layer 13 can be suppressed even when the energy of light emitted by light source 11 is increased, and thus high output can be achieved.

[Result of Thermal Analysis on Wavelength Conversion Device 1]

Figure 7A:
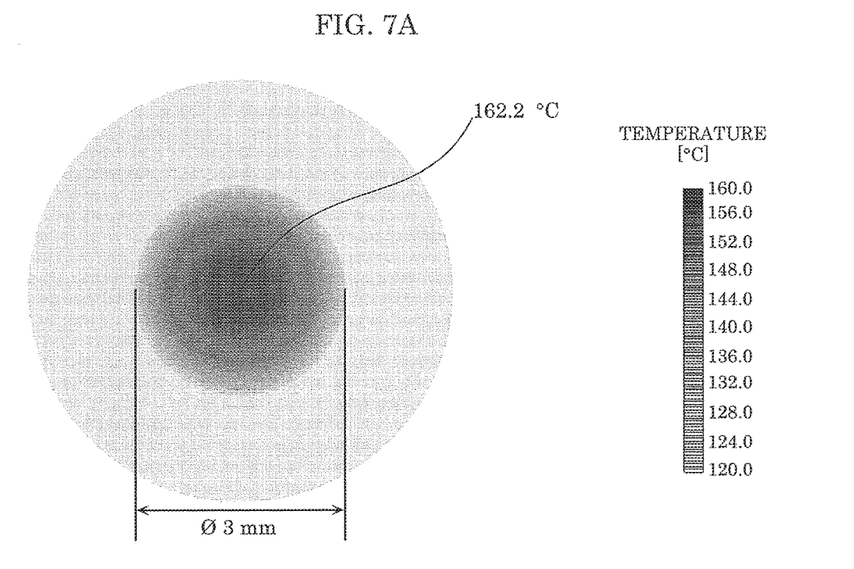
FIG. 7A is a diagram illustrating an example of a result of thermal analysis of the comparative example.
Figure 7B:
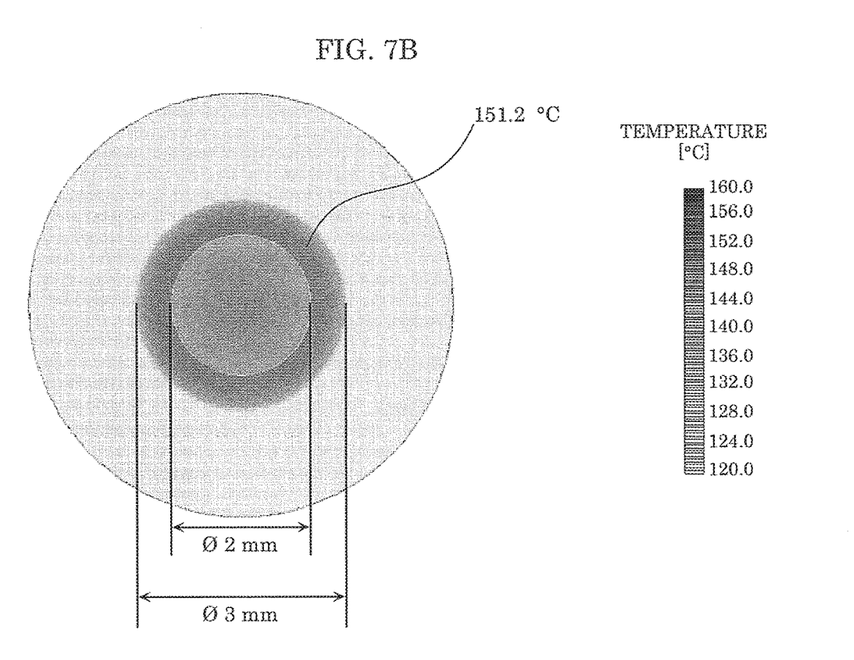
FIG. 7B is a diagram illustrating an example of a result of thermal analysis of the embodiment.

FIG. 7A is a diagram illustrating an example of a result of thermal analysis of the phosphor layer in the comparative example. FIG. 7B is a diagram illustrating an example of a result of thermal analysis of the phosphor layer in this embodiment.

As illustrated in FIG. 7A, in the comparative example, the energy of light 11a is concentrated on region 52a (Ø 3 mm homogenous region in the figure) of phosphor layer 13, and thus it can be seen that the temperature at the center portion of the region is highest at 162.2° C.

In contrast, as illustrated in FIG. 7B, in this embodiment, the energy of light 11a is projected in a ring shape such that the energy is dispersed, and thus the temperature of the Ø2 mm to Ø3 mm annular portion of region 13a of phosphor layer 13 is highest at 151.2° C. Furthermore, in the analysis result illustrated in FIG. 7B, the total heat value is 5 W, and the heat value is 4 W at the Ø2 mm to Ø3 mm annular portion and 1 W at the Ø0 mm to Ø2 mm center portion.

Therefore, it can be seen that, compared to phosphor layer 13 in the comparative example, it is possible to prevent concentration of the energy of light 11a in phosphor layer 13 in this embodiment.

[Advantageous Effects, Etc.]

As described above, waveform conversion device 1 in this embodiment includes, between light source 11 and phosphor layer 13, an optical component that projects, by diffraction, the light entering from light source 11 onto the incidence face of phosphor layer 13 in a ring shape. Accordingly, it is possible to achieve high output while reducing the thermal load on phosphor layer 13.

More specifically, a wavelength conversion device according to an aspect of the present invention includes light source 11 that emits light having a predetermined wavelength included in a wavelength range from ultraviolet light to visible light; phosphor layer 13 that converts the wavelength of light from light source 11 which is incident on an incidence face thereof; and optical component 12 that is disposed between light source 11 and phosphor layer 13, and projects light emitted by light source 11 onto the incidence face of phosphor layer 13 in a ring shape.

Accordingly, since the light emitted by light source 11 is projected onto the incidence face of phosphor layer 13 in a ring shape, concentration of energy on the incidence face of phosphor layer 13 can be prevented. Consequently, since the rise in temperature of phosphor layer 13 can be suppressed even when the energy emitted by light source 11 is increased, high output by wavelength conversion device 1 can be achieved.

Here, for example, the light emitted by light source 11 which has been projected in a ring shape by optical component 12 is centered on the optical axis of light source 11 and incident on the incidence face with a diameter less than or equal to the diameter of the light emitted by light source 11.

Furthermore, for example, optical component 12 is a diffractive microlens array.

Accordingly, since the incident light is diffracted by the microlens array, it is possible to reduce optical loss of light emitted by light source 11, and thus high output can be achieved.

It should be noted that the configuration of diffractive lens array 122 is not limited to the case of having a single rectilinear transmission portion 122c as described above. Two rectilinear transmission portions or three or more rectilinear transmission portions may be included when they can be provided in the region included in the spot diameter of the light of light source 11. Hereinafter, the case where the diffractive lens array includes two rectilinear transmission portions will be described.

Figure 8:
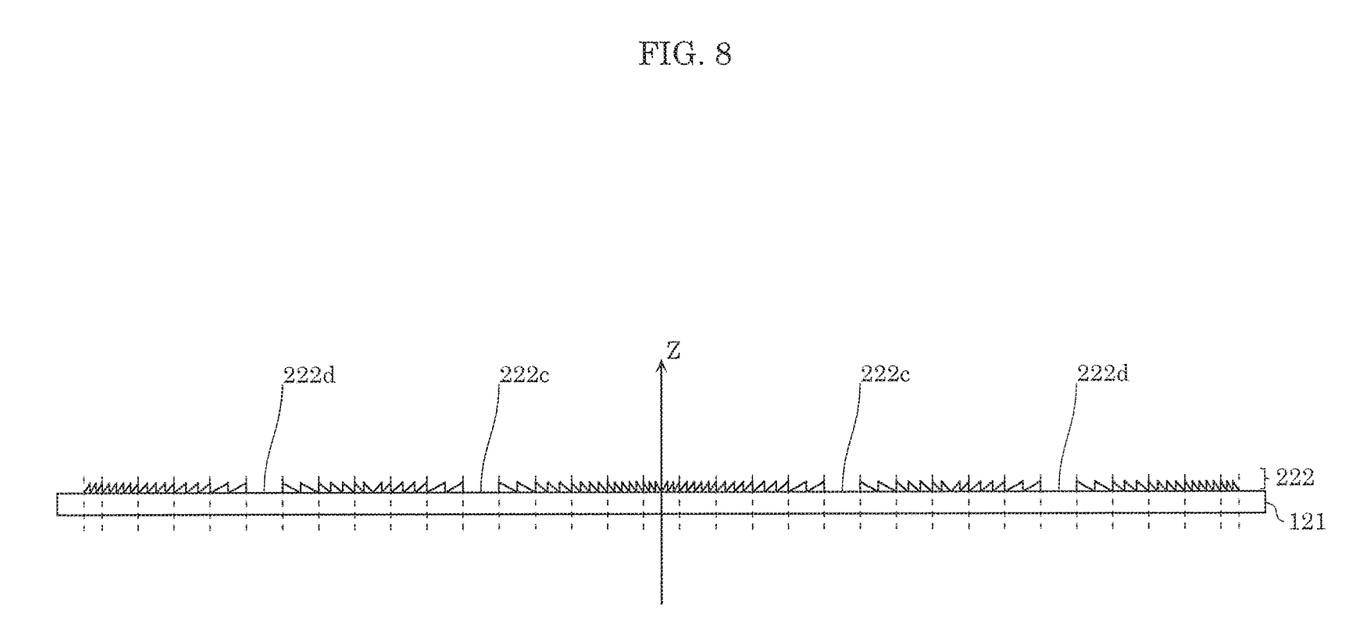
FIG. 8 is a diagram illustrating a cross-sectional view of another example of a configuration of the optical component in the embodiment.
Figure 9:
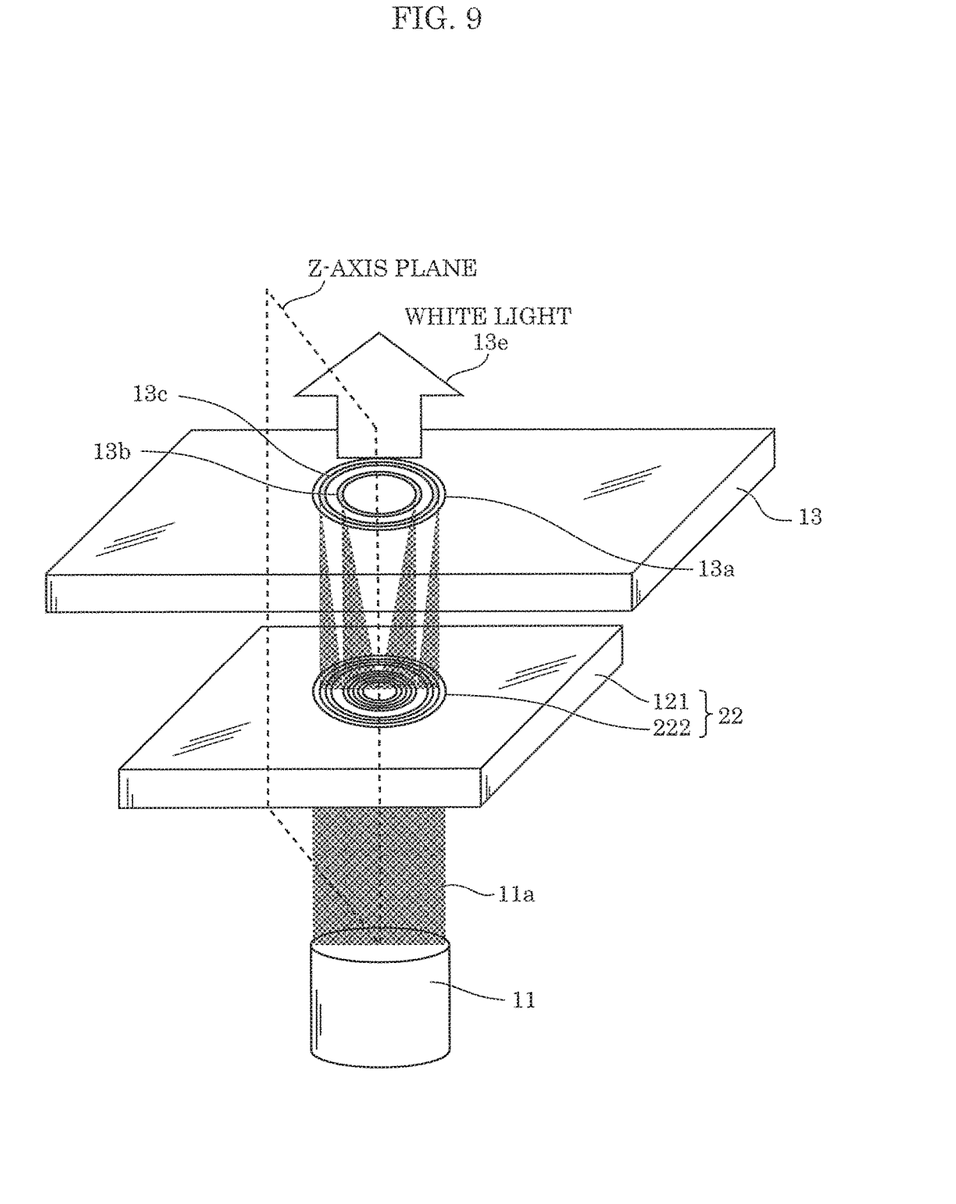
FIG. 9 is a diagram for describing the operation of a wavelength conversion device including the optical component illustrated in FIG. 8.

FIG. 8 is a diagram illustrating a cross-sectional view of another example of a configuration of optical component 22 in this embodiment. FIG. 9 is a diagram for describing the operation of wavelength conversion device 1 including optical component 22 illustrated in FIG. 8. The same numerical reference marks are assigned to components that are the same as those in FIG. 3B and FIG. 4, and detailed description thereof will be omitted.

Optical component 22 is disposed between light source 11 and phosphor layer 13, and projects the light emitted by light source 11 in ring shapes onto the incidence face of phosphor layer 13. Optical component 22 projects the light emitted by light source 11 in two ring shapes (to become rings 13b and 13c in FIG. 9), which are centered on the optical axis of light source 11 and have diameters less than or equal to the diameter of the light emitted by light source 11, onto the incidence face of phosphor layer 13. Here, the two rings (ring 13b and ring 13c) are concentric. Optical component 22 is an example of a diffractive microlens array, and, as illustrated in FIG. 9, for example, includes base material 121 and diffractive lens array 222.

As illustrated in FIG. 8 for example, diffractive lens array 222 is provided in the emission face of optical component 22 (diffractive microlens array), and includes diffractive lenses that diffract the light emitted by light source 11 and two rectilinear transmission portions (rectilinear transmission portions 222c and 222d) that rectilinearly transmit the light emitted by light source 11.

It should be noted that, the pitch of the diffractive lenses increases from the center of optical component 22 to rectilinear transmission portion 222c, and decreases from rectilinear transmission portion 222c to an intermediate position between rectilinear transmission portion 222c and rectilinear transmission portion 222d, in a top view. Furthermore, the pitch of the diffractive lenses increases from the intermediate position between rectilinear transmission portion 222c and rectilinear transmission portion 222d to rectilinear transmission portion 222d, and decreases from rectilinear transmission portion 222d outward.

By being provided in the above-described manner, the diffractive lenses are capable of diffracting the light emitted by light source 11 which has entered from one side in the Z-axis, toward the light rectilinearly transmitted by rectilinear transmission portion 222c or rectilinear transmission portion 222d.

In this manner, as illustrated in FIG. 9, optical component 22 projects light 11a emitted by light source 11 in ring shapes (to become rings 13b and 13c in the figure) onto the incidence face of phosphor layer 13. Then, phosphor layer 13 can produce white light 13e.

It should be noted that light 11a emitted by light source 11 is projected in two ring shapes onto the incidence face of phosphor layer 13 in the above-described example, but is not limited to such. By providing three or more rectilinear transmission portions, the light may be projected onto the incidence face of phosphor layer 13 in three or more ring shapes.

(Variation 1)

The configuration of wavelength conversion device 1 according to the present embodiment is not limited to that described in the foregoing embodiment. A microlens array having a diffractive lens array different from above-described diffractive lens array 122 may be further provided on phosphor layer 13. Hereinafter, an example of such a case will be described as a variation.

Figure 10:
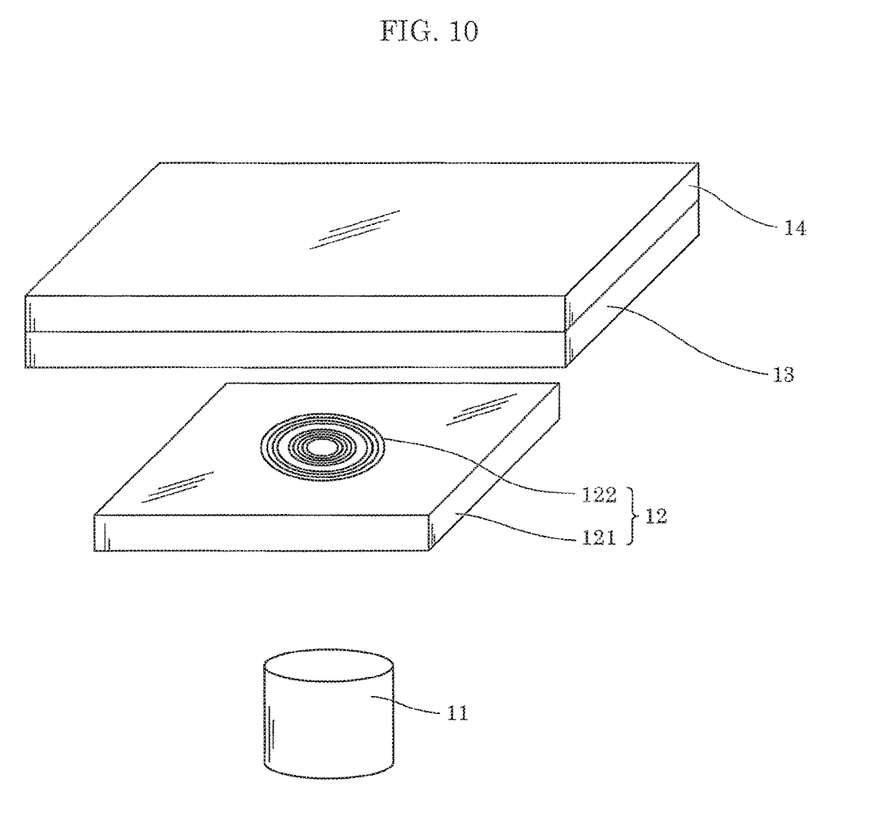
FIG. 10 is a diagram illustrating an example of a configuration of a wavelength conversion device in a variation.
Figure 11:
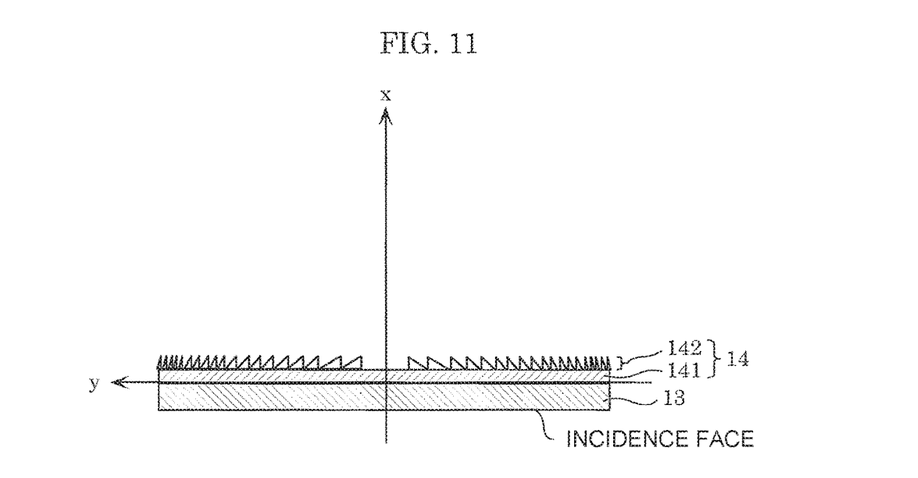
FIG. 11 is a cross-sectional view of a microlens array in the variation.
Figure 12:
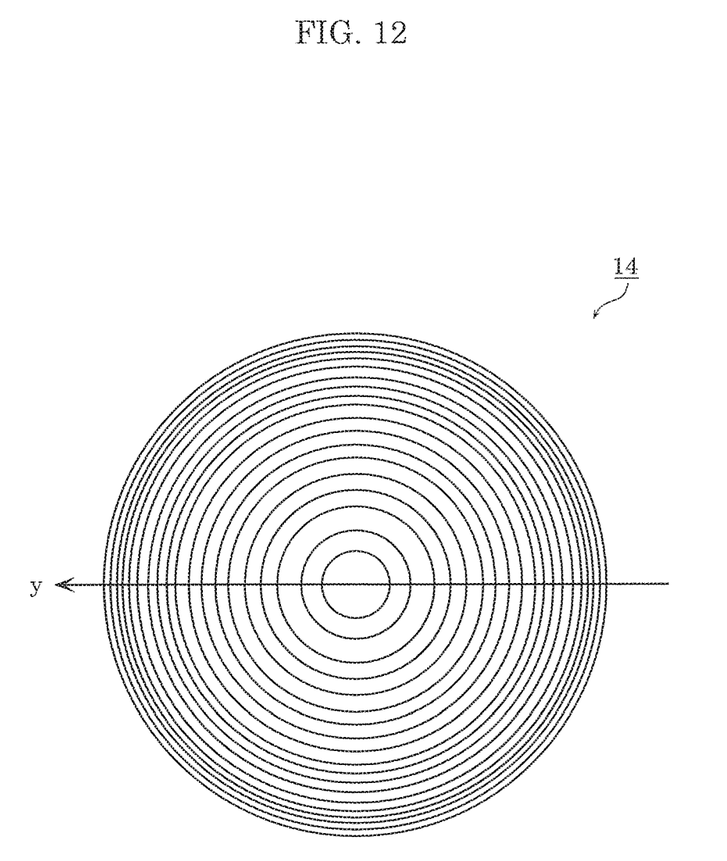
FIG. 12 is a top view of the microlens array illustrated in FIG. 11.

FIG. 10 is a diagram illustrating an example of a configuration of wavelength conversion device in this variation. FIG. 11 is a cross-sectional view of microlens array 14 in this variation. FIG. 12 is a top view of microlens array 14 illustrated in FIG. 10. The same numerical reference marks are assigned to components that are the same as those in FIG. 2, and detailed description thereof will be omitted.

Microlens array 14 includes base material 141 and diffractive lens array 142.

Base material 141 is the base material of microlens array 14, and is formed in a tabular shape. In this variation, base material 141 is formed on phosphor layer 13. Diffractive lens array 142 is formed on base material 141.

Since the material forming base material 141 is the same as base material 121, detailed description will be omitted. However, a material having a similar refractive index as phosphor layer 13 may be used in order to facilitate entry of light from phosphor layer 13. Here, similar refractive index means that the refractive index difference between both materials is ±0.2 or less. Furthermore, although not particularly illustrated in the figures, phosphor layer 13 and base material 141 may be bonded together by an adhesive layer having a similar refractive index as both phosphor layer 13 and base material 141. The material of the adhesive layer includes an acryl resin, an epoxy resin, or the like. Furthermore, base material 141 may be transparent with no light absorption, and may be formed from a material having a substantially 0 extinction coefficient.

Diffractive lens array 142 emits, from its emission face, the part of the light that has been wavelength-converted by phosphor layer 13 and the other part of the light that was transmitted by phosphor layer 13. As illustrated in FIG. 11, diffractive lenses for diffracting the part of the light that has been wavelength-converted and the other part of the light that was transmitted and emitting the diffracted light are provided in the emission face of diffractive lens array 142. As illustrated in FIG. 12 for example, the diffractive lenses are provided in concentric circle shapes in the emission face. In this embodiment, the cross-section of the diffractive lenses taken along a plane perpendicular to the emission face is described as being sawtooth-shaped but is not limited to such, and may be rectangular, triangular, or hemispherical.

Furthermore, the diffractive lenses are provided to cause the part of the blue light that has been wavelength-converted into yellow light by phosphor layer 13 and the blue light that was transmitted by phosphor layer 13 to diffract and focus on the opening of optical fiber 2 which is a predetermined area. As such, the pitch of the diffractive lenses is different for each of predetermined sections (zones). Furthermore, the pitch of the diffractive lenses decreases from the center of diffractive lens array 142 to the periphery.

Since the material of diffractive lens array 142 is the same as that of diffractive lens array 122, detailed description thereof will be omitted. However, diffractive lens array 142 may be formed using a material having a similar refractive index as base material 141 to facilitate entry of light from base material 141. In addition, like base material 141, diffractive lens array 142 may be transparent with no light absorption, and may be formed from a material having a substantially 0 extinction coefficient.

It should be noted that, in order to facilitate entry of light from phosphor layer 13 to diffractive lens array 142, microlens array 14 may be formed directly in (integrally formed with) phosphor layer 13. In this case, microlens array 14 may be formed using the resin that forms phosphor layer 13, or may be formed using a material having a similar refractive index as phosphor layer 13.

Other Embodiments, Etc.

The above-described embodiment is merely one example, and various modifications, additions, and omissions are possible.

Furthermore, forms realized by arbitrarily combining components and functions shown in the above-described embodiment are included in the scope of the present invention. Forms obtained by various modifications to each of the foregoing embodiments that can be conceived by a person of skill in the art as well as forms realized by arbitrarily combining structural components and functions in each of the embodiments which are within the scope of the essence of the present invention are included in the present invention.

For example, a lighting apparatus using wavelength conversion device 1 in the foregoing embodiment is included in the present invention. Using wavelength conversion device 1 in the foregoing embodiment in a lighting apparatus enables further decrease in size than with a lighting apparatus using an LED light source.

It should be noted that the size of diffractive lens array 122 may be bigger than the spot diameter of the light of light source 11, and can take an arbitrary value as long as the luminous flux of the light emitted by light source 11 is not changed.

The invention claimed is:

1. A wavelength conversion device, comprising:
   a light source that emits light having a wavelength that is predetermined, the wavelength being included in a wavelength range from ultraviolet light to visible light;
   a phosphor layer that converts the wavelength of light from the light source which is incident on an incidence face of the phosphor layer; and
   an optical component that is disposed between the light source and the phosphor layer, and projects light emitted by the light source onto the incidence face of the phosphor layer in a ring shape.

2. The wavelength conversion device according to claim 1, wherein
   the optical component projects the light emitted by the light source onto the incidence face, in a ring shape centered on an optical axis of the light source and having a diameter less than or equal to a diameter of the light emitted by the light source.

3. The wavelength conversion device according to claim 1, wherein
   the optical component is a diffractive microlens array.

4. The wavelength conversion device according to claim 1, wherein
   the optical component includes, on an emission face:
      a plurality of diffractive lenses that diffract the light emitted by the light source; and
      a rectilinear transmission portion that rectilinearly transmits the light emitted by the light source, and
   a pitch of the plurality of diffractive lenses is different for each of predetermined sections.

5. The wavelength conversion device according to claim 4, wherein
   the pitch of the plurality of diffractive lenses increases from a center of the optical component to the rectilinear transmission portion, and decreases from the rectilinear transmission portion outward, in a top view.

6. The wavelength conversion device according to claim 4, wherein
   the plurality of diffractive lenses are provided in concentric circle shapes on the emission face.

7. The wavelength conversion device according to claim 4, wherein
   a cross-section of the plurality of diffractive lenses taken along a plane perpendicular to the emission face is sawtooth-shaped.

8. The wavelength conversion device according to claim 1, wherein
   the optical component projects the light emitted by the light source in a plurality of ring shapes onto the incidence face of the phosphor layer, and
   the plurality of ring shapes are concentric.

9. The wavelength conversion device according to claim 8, wherein
   the optical component includes, on an emission face:
      a plurality of diffractive lenses that diffract the light emitted by the light source; and
      a plurality of rectilinear transmission portions that rectilinearly transmit the light emitted by the light source.

10. The wavelength conversion device according to claim 1, wherein
    the light source emits blue light as the light, and
    the phosphor layer converts a wavelength of part of the light into a wavelength range representing yellow light.

11. A lighting apparatus, comprising:
    the wavelength conversion device according to claim 1.

* * * * *